US012488534B2

(12) United States Patent
Libertowski et al.

(10) Patent No.: US 12,488,534 B2
(45) Date of Patent: Dec. 2, 2025

(54) ENHANCED STOCK STENTS BASED ON POPULATION MODELING OF TUBULAR ANATOMICAL STRUCTURES

(71) Applicants: The Cleveland Clinic Foundation, Cleveland, OH (US); VisionAir Solutions, LLC, Cleveland, OH (US)

(72) Inventors: Kevin Libertowski, Cleveland, OH (US); Keith Grafmeyer, Cleveland, OH (US); Thomas Gildea, Cleveland Heights, OH (US); William Flickinger, Wadsworth, OH (US); Brian Beckrest, Lakewood, OH (US)

(73) Assignees: The Cleveland Clinic Foundation, Cleveland, OH (US); VisionAir Solutions, LLC, Cleveland, OH (US)

( * ) Notice: Subject to any disclaimer, the term of this patent is extended or adjusted under 35 U.S.C. 154(b) by 163 days.

(21) Appl. No.: 18/484,874

(22) Filed: Oct. 11, 2023

(65) Prior Publication Data

US 2024/0119669 A1 Apr. 11, 2024

Related U.S. Application Data

(60) Provisional application No. 63/415,068, filed on Oct. 11, 2022.

(51) Int. Cl.
*G06T 17/00* (2006.01)
*A61B 34/10* (2016.01)
(Continued)

(52) U.S. Cl.
CPC .............. *G06T 17/00* (2013.01); *A61B 34/10* (2016.02); *G06T 7/0012* (2013.01); *G06T 7/62* (2017.01);
(Continued)

(58) Field of Classification Search
CPC ......... G06T 17/00; G06T 7/62; G06T 7/0012; G06T 2207/10081; G06T 2207/30172;
(Continued)

(56) References Cited

U.S. PATENT DOCUMENTS

2003/0197734 A1* 10/2003 Binkert .................. G06Q 10/10
715/771
2010/0023105 A1* 1/2010 Levy ................ A61B 17/12022
623/1.2
(Continued)

FOREIGN PATENT DOCUMENTS

DE 102011076820 A1 12/2012

OTHER PUBLICATIONS

Derycke, Lucie, "Patient Specific Computer Modelling for Automated Sizing of Fenestrated Stent Grafts", Feb. 2020, European Journal of Vascular and Endovascular Surgery, vol. 59, pp. 237-246 (Year: 2020).*

(Continued)

*Primary Examiner* — Terrell M Robinson
(74) *Attorney, Agent, or Firm* — Calfee, Halter & Griswold LLP (57) ABSTRACT

Technologies as described herein are directed towards generating optimized stent designs for treatment of tubular anatomical structures. In an exemplary computing system, the system obtains imaging data comprising images representative of anatomical structures. The system then generates a plurality of models based upon the imaging data. The models are then clustered based upon similar characteristics of the models. Certain fit parameters are applied to the models in each cluster and an optimized stent shape is generated for each cluster, wherein each optimized stent shape is representative of the models within the cluster.

20 Claims, 7 Drawing Sheets

(51) Int. Cl.
*G06T 7/00* (2017.01)
*G06T 7/62* (2017.01)
*G06T 7/66* (2017.01)

(52) U.S. Cl.
CPC .......... *G06T 7/66* (2017.01); *A61B 2034/104* (2016.02); *A61B 2034/105* (2016.02); *G06T 2207/10081* (2013.01); *G06T 2207/30004* (2013.01); *G06T 2207/30172* (2013.01); *G06T 2210/41* (2013.01)

(58) Field of Classification Search
CPC .............. A61B 34/10; A61B 2034/104; A61B 2034/105
See application file for complete search history.

(56) References Cited

U.S. PATENT DOCUMENTS

| | | | |
|---|---|---|---|
| 2018/0289515 A1* | 10/2018 | Nemes | A61F 2/88 |
| 2020/0380177 A1* | 12/2020 | Schroeder | B33Y 50/00 |
| 2021/0259777 A1* | 8/2021 | Chatzizisis | G16H 30/40 |
| 2021/0290308 A1* | 9/2021 | Mihalef | A61B 34/10 |
| 2022/0265353 A1 | 8/2022 | Gildea et al. | |
| 2022/0270762 A1* | 8/2022 | Crawford | G06V 10/25 |
| 2023/0394182 A1 | 12/2023 | Libertowski et al. | |
| 2023/0394202 A1 | 12/2023 | Libertowski et al. | |

OTHER PUBLICATIONS

Zhao, Shijia, "Patient-specific computational simulation of coronary artery bifurcation stenting", Aug. 2021, Scientific Reports, vol. 11, pp. 1-17 (Year: 2021).*
International Search Report and Written Opinion from PCT/US2023/076560 dated Jan. 23, 2024.

* cited by examiner

ENHANCED STOCK STENTS BASED ON POPULATION MODELING OF TUBULAR ANATOMICAL STRUCTURES

CROSS-REFERENCE TO RELATED APPLICATION(S)

This application claims priority to and any benefit of U.S. Provisional Application No. 63/415,068, filed Oct. 11, 2022, the content of which is incorporated herein by reference in its entirety.

BACKGROUND

Airway stents, or tracheobronchial prostheses, are hollow tubes that are inserted into an airway to treat disorders of the airway, such as tracheal collapse. They are usually placed bronchoscopically. Commercially available airway stents come in limited shapes and sizes and may poorly fit in patients with complex airways. The commercially available stent shapes also often result in a poor fit because aging standard designs are limited in geometry and were not designed with anatomical specifications (e.g., curvature, varying diameter, and angulation of parent and child branches) across different patient populations in mind. A poorly fitted airway stent can cause a variety of complications including, but not limited to, stent occlusion, granulation tissue formation, infection, biofilm, and migration.

Similar problems exist with other anatomical tubular structures that may require stenting. Conventionally, clinicians rely upon a fixed number of shapes and/or sizes of stents that are commercially available or "off-the-shelf." The need for stents in emergency situations further limits clinician options for stents that may or may not be easily obtained within the emergency period.

SUMMARY

The following is a brief summary of subject matter that is described in greater detail herein. This summary is not intended to be limiting as to the scope of the claims.

Described herein are various technologies pertaining to an enhanced stock stent application that is configured to generate one or more optimized stent designs (e.g., enhanced stock stents) for repair of tubular anatomical structures (e.g., a human airway). In a first example, a computing device comprises a processor and a memory storing an enhanced stock stent (ESS) application. When the ESS application is executed by the processor, it causes the processor to perform certain acts. In an example, the ESS application obtains imaging data, wherein the imaging data comprises a plurality of images captured from a patient population.

From the imaging data the ESS application generates a plurality of airway models based upon the imaging data. Specifically, the ESS application generates each airway model based upon a corresponding imaging data, wherein the airway model is indicative of at least a portion of an airway tree depicted in the imaging data. The ESS application determines, for at least a subset of the plurality of airway models, an airway centerline within at least one airway model (first branch) and at least a second airway model (second branch). In some examples, the ESS application determines centerlines for all of the airway models. In other examples, the ESS application determines centerlines for only a portion of the plurality of airway models. The ESS application further determines, for the subset of the plurality of airway models, one or more airway characteristics based upon the airway centerline of the first airway model and one or more airway characteristics based upon the centerline of the second airway model. The airway characteristics may be determined based upon the centerline of each airway or airway branch. The airway characteristics are related to the shape and size of each airway branch (e.g., branch length, branch diameter, etc.)

The ESS application then clusters the subset of the plurality of airway models based upon the determined centerline and/or airway characteristics. For each cluster, the ESS application determines one or more stent fit parameters for the airway models associated with each cluster. The ESS application then generates a stent shape for each cluster, wherein the generated stent shape is based upon the shared parameters of the airway models in each cluster.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

These and other features of the present disclosure will become better understood with regard to the following description and accompanying drawings in which.

DETAILED DESCRIPTION

Various technologies pertaining to an enhanced stock stent (ESS) application for optimized stent generation are described in detail herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by other or multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "module", "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Moreover, the acts or functionality described herein may be embodied as computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Described herein are various technologies directed towards an enhanced stock stent (ESS) application configured to generate one or more optimized stent designs for treatment or repair of tubular anatomical structures (e.g., a human airway). In an example, the generated optimized stent designs are used for treatment of narrowed or stenotic tubular anatomical structures. Generating an optimized stent design may comprise generation of a novel stent design or may additionally or alternatively comprise identification of an existing stent design that is within an acceptable deviation from an optimized stent design as determined by the ESS application. According to some exemplary embodiments, the ESS application takes data from many different native and/or nonpathological airways (or other anatomical tubular structures) and builds airway models that match the curvature, diameter, and/or branching angles of airway branches. In some embodiments, a pathological model may be created and used for diagnostics and shape matching. While certain ESS models as described herein may be generated by modeling the left main stem (LMS) of an airway, it is an aspect of the present disclosure that concepts disclosed herein may be applied to any tubular structure to extract quantitative information about the shape and size of a structure to construct generalized shapes optimized to fit a given population. Therefore, exemplary embodiments may be applied to other tubular structures that require stenting such as cardiovascular vessels, the digestive tract, urethral tract, etc.

According to an exemplary embodiment, a computing system comprises a processor and a memory storing an enhanced stock stent (ESS) application. When the ESS application is executed by the processor, the application causes the processor to perform certain functionality as described herein. For example, when executed by the processor, the ESS application obtains imaging data, wherein the imaging data comprises a plurality of images captured from a patient population. The imaging data may be obtained, for example, from an imaging data store. In an example, the imaging data comprises computed tomography (CT) scan data. A CT scan (usually abbreviated to CT scan; also referred to as computed axial tomography scan, or CAT scan) is a medical imaging technique used to obtain detailed internal images of the body.

Using the imaging data (e.g., chest CT scan images), the ESS application may generate airway models from the imaging data. In an example, the airway models are generated by segmenting vessels and/or tubular structures from the images (creating 3-Dimensional anatomical models). The ESS application may then extract an accurate centerline from the airway models or portion thereof (e.g., one or more branches of the airway) and determine one or more airway characteristics based upon the extracted centerlines. Using these determined airway characteristics, aspects of the anatomical structures can be parameterized for distribution modeling of a patient population, whereby the application may further generate an optimized stent for a given population and/or identify an existing stent that would be appropriate for the given population. According to another exemplary embodiment, the ESS application obtains imaging data related specifically to the left main stem (LMS) of one or more airways. It is an aspect of the ESS application that individual airways or portions thereof may be characterized by the ESS application for purposes of generation of a generalized stent or stent shape for that airway or similar airways.

As indicated above, the centerline determined by the ESS application enables accurate clustering of similar airway models according to the determined centerline and/or airway characteristics determined based upon the centerline. Once similar airway models are clustered, the ESS application uses the centerline and/or airway characteristics to fit a spline curve for each centerline in each cluster. As determined by the ESS application, the centerline provides a gold standard line (e.g., best available fit under reasonable conditions) which can be fit with a spline curve. The ESS applicant may then use the spline curve to derive quantitative shape and size information such as length, curvature, diameter(s), branching angles (e.g., for branching stent designs (Y branch, etc.) of the structure. Furthermore, multiple population models may be utilized for a given anatomical structure to derive optimized implant designs based on demographics such as sex, height, age, etc. By creating different models based on demographics that affect the shape and size of a target anatomical structure can yield better-fitting implants and larger population capture.

The present concepts offer various advantages over conventional approaches, such as, for example, better-fitting stent implants than those that are available off-the-shelf, better-fitting stent implant options for time sensitive or emergency cases, a reduction in stent-related complications from poorly fitting stock stents, and/or a reduction in the inventory requirements for various stents. Furthermore, the conventional process for selecting a "stock" stent (e.g., a stent that has already been generated according to stock parameters and has no relationship to an individual patient or group of patients) is improved by narrowing the available choices a clinician must consider when choosing a stent to implant. Moreover, the conventional process may be further improved by eliminating the need for a clinician to make any choice of stock stents in favor of a computer-generated recommendation of an appropriate stock stent (e.g., as generated by the ESS application). Furthermore, the present concepts are further advantageous over patient-specific stent generation methodologies that require a customized stent to be generated based upon measurements specific to that patient. Specifically, the customized stent generation process is both expensive in labor, manufacturing resources (and turnaround time), and computing resources. Alternatively, computing resources are saved though the present methodologies because the optimized stents generated for each cluster are highly correlated with a patient population demographic associated with the cluster; accordingly, a patient with similar characteristics of a determined cluster may not require a custom stent to be generated, and instead may achieve a satisfactory stent outcome using the cluster-associated optimized stent. This results in an overall reduction of the computing resources needed to generate an appropriately fitting stent. An additional benefit is the reduction or elimination of wait time required for patients that otherwise would require a customized stent (e.g., because an optimized stent is acceptable).

Figure 1:
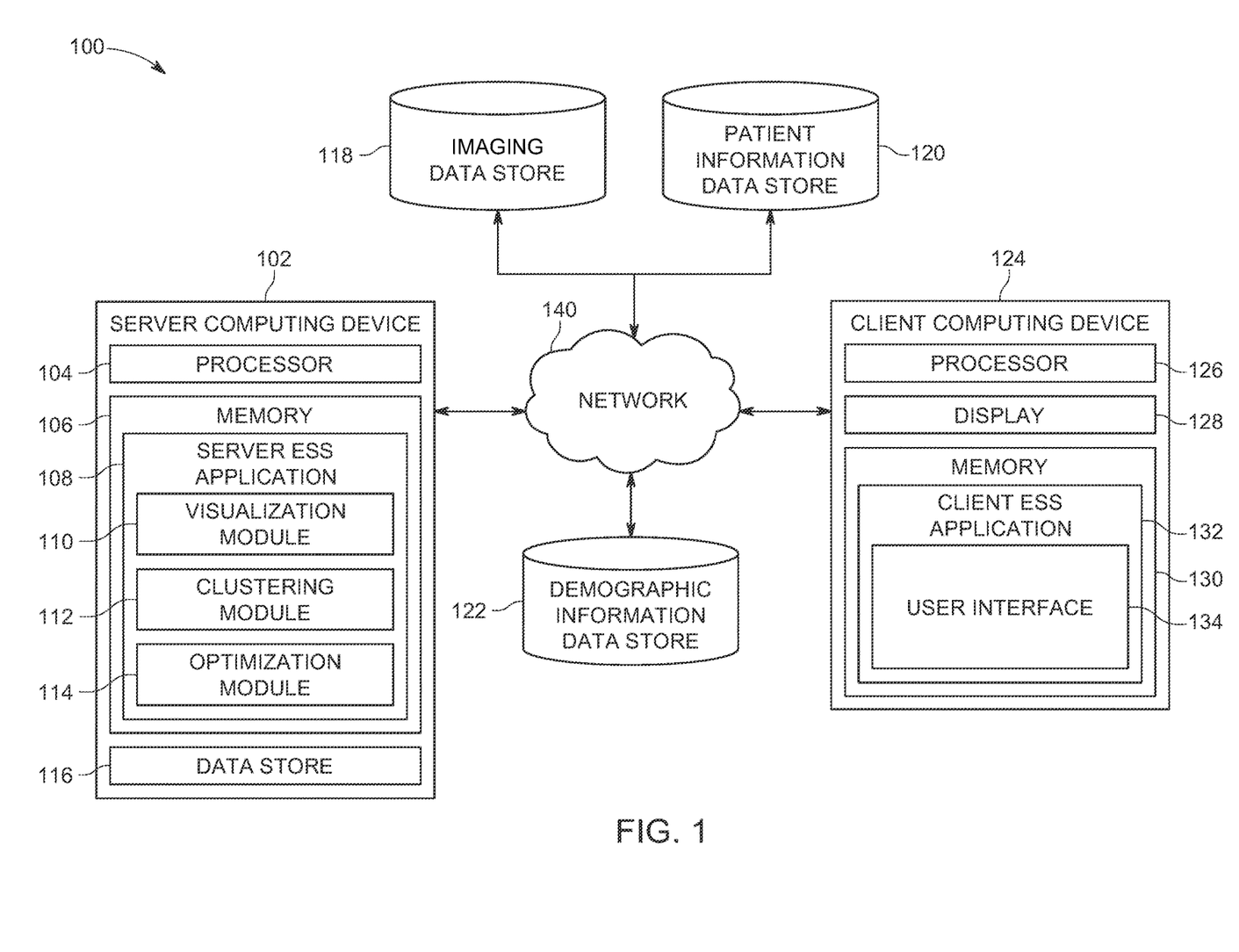
FIG. 1 illustrates an exemplary enhanced stock stent (ESS) system.

Referring now to FIG. 1, a functional block diagram of system 100 is illustrated. System 100 comprises a server computing device 102 and a client computing device 124 in network communication with one another via network 140 (e.g., the Internet, an intranet, or the like). System 100 may further comprise one or more network connected (e.g., via network 140) data stores such as imaging data store 118, patient information data store 120, and/or demographic information data store 122. While shown as multiple discrete data stores, it is appreciated that imaging data store 118, patient information data store 120, and/or demographic information data store 122 may be embodied or otherwise organized in alternative manners, for example, within a single data store environment and/or distributed among a plurality of disparate data stores. As depicted, the ESS application is a distributed application with both server-side and client-side functionality, wherein the server computing device 102 executes a server ESS application 108 and the client computing device 124 executes a client ESS application 132. In certain embodiments, the ESS application may be executed locally on a client computing device (e.g., client computing device 124) to perform the same or similar functionality as described in a distributed system, with functionality of the ESS application being performed at the client computing device executing the ESS application.

The server computing device 102 and the client computing device 124 may be any suitable type of computing device, including a desktop computing device, a laptop computing device, a tablet computing device, etc. The server computing device 102 comprises a processor 104 and a memory 106. The memory 106 has a server ESS application 108 stored therein, that when executed by the processor 104, causes the server computing device 102 to perform acts associated with the server ESS application 108. The server computing device 102 further comprises a data store 116, which is configured to store information related to the server ESS application 108, such as, for example, user configuration settings, user profile information, historical data related to operation of ESS application 108 (and or client ESS application 132), etc. The client computing device 124 comprises a processor 126 and a memory 130. The memory 130 has a client ESS application 132 stored therein, that when executed by processor 126, causes the client computing device 124 to perform acts associated with the client ESS application 132. The client ESS application 132 further comprises a user interface 134 configured to display content associated with client ESS application 132 at display 128.

The server computing device 102 and/or the client computing device are connected via network 140 to imaging data store 118, patient information data store 120, and demographic information data store 122. The imaging data store 118 comprises a plurality of medical imaging data. In an example, imaging data store 118 comprises computed tomography (CT) scan data, magnetic resonance imaging (MRI) data, or any other medical imaging modality. The patient information data store 118 comprises patient information, for example, medical record information such as height, weight, age, family history, etc. In some embodiments, the patient information data store 118 is an electronic health records application configured to obtain patient information and/or is in network communication with one or more electronic health records applications configured to obtain patient information. Demographic information data store 122 comprises demographic information related to various patient populations. In some embodiments, server ESS application 108 may correlate imaging data from imaging data store 118 with patient information from patient information data store 120 and/or demographic data from demographic information data store 122.

Exemplary operation of the server ESS application 108 will now be described through reference to its component parts. The server ESS application 108 comprises a visualization module 110, a clustering module 112, and an optimization module 114. In some embodiments, client ESS application 132 comprises a visualization module 110, a clustering module 112, and an optimization module 114 for performing the ESS application functionality locally on the client computing device 124. While described as separate components, it is appreciated that each operation performed by the visualization module 110, the clustering module 112, and/or the optimization module 114, may also be described as being performed by server ESS application 108. The visualization module 110 is configured to generate visualization models (e.g., 3-dimensional models) based upon imaging data. In one example, upon receiving imaging data (e.g., from imaging data store 118) comprising one or more chest CT scans, the server ESS application 108 is configured to generate (via visualization module 110) an airway model corresponding to an airway depicted in the CT scans. It is appreciated the airway model that is generated may be representative of an entire airway or portion thereof. In an example, only an area of interest is modeled, for example, only the left main stem of an airway. The area of interest may be altered in accordance with the particular situation to be modeled, the stent desired, etc. In certain embodiments, multiple CT scans of the same patient can be used to create a composite image from which visualization module 110 may generate a corresponding composite airway model. In an example, the visualization module 110 generates a visualization model via image segmentation. In certain embodiments, the exemplary methodologies used for image segmentation are those taught by U.S. patent application Ser. No. 18/204,923, which is incorporated by reference herein, in its entirety. In some embodiments, once generated by the server ESS application 108, the server ESS application 108 causes the visualization to be displayed at client computing device 124 (e.g., by way of user interface 134).

From the airway models generated vis-à-vis the visualization module 110, the server ESS application 108 is configured to extract (i.e., determine, calculate, etc.) one or more centerlines associated with the airway. The centerline is a mathematical approximation of the center of the airway throughout the area of interest. For example, if the area of interest only pertains to one branch of an airway (e.g., a left main stem) the extracted centerline is indicative of the central point of the airway throughout that area of interest. In another example, if the area of interest is a Y-branch, the visualization module 110 will be used to extract 3 centerlines (one for each branch of the airway). It is appreciated that the number of centerlines will differ based upon the number of airways within an area of interest.

Figure 2:
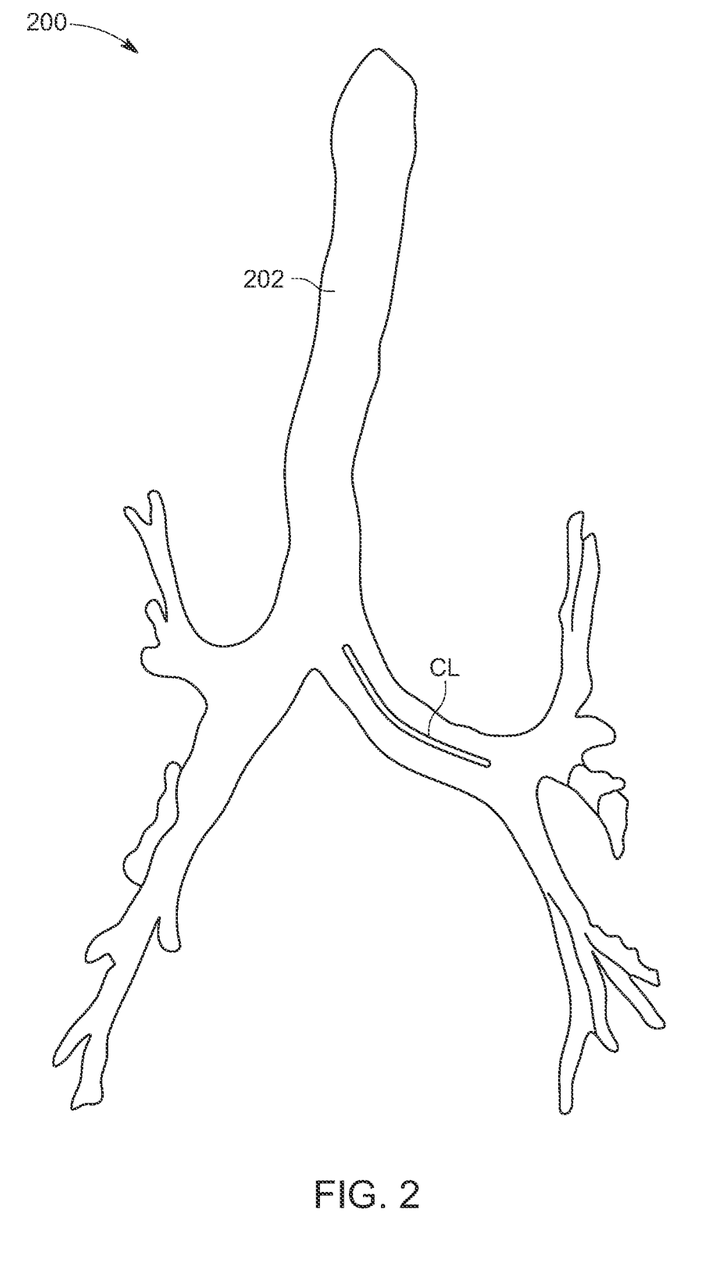
FIG. 2 illustrates an exemplary airway model with a generated centerline (CL)

An exemplary extracted centerline (CL) is depicted within airway 202 in FIG. 2. Once a centerline is determined for one or more airway models, the server ESS application 108 is configured to align the centerlines to a consistent coordinate system. By aligning the centerlines, the comparison of each centerline-airway model pair is improved. The server ESS application 108 is further configured to calculate a path length for each centerline. The path length is indicative of the length of the centerline throughout the area of interest. In some embodiments, an initial area of interest may be altered (e.g., narrowed or broadened) during the evaluation process carried out by the server ESS application 108 (e.g., via one or more user inputs received at the client ESS application 132). As the area of interest changes the calculated path length will also change in a corresponding manner. In some embodiments, the area of interest corresponds to the area of the tubular structure to be stented.

After the centerline path length has been obtained, the server ESS application 108 calculates the one or more diameter characteristics of the airway (e.g., average diameter, minimum diameter, maximum diameter, etc.). In an example, the server ESS application 108 takes a plurality of diameter measurements at consistent intervals along the centerline (or centerlines in the case of a multi-branch airway). As airways may not be perfectly cylindrical, an array of radii may be used to determine the diameter characteristics of the airway. In an example, the length of rays casted radially outward from the centerline are used to detect airway cross-sections (e.g., at the intersection point of rays). In certain embodiments, the methodology used to extract centerline and/or calculate the one or more diameter characteristics is that as described in U.S. patent application Ser. No. 18/204,924, which is incorporated by reference herein, in its entirety.

The server ESS application 108 further comprises a clustering module 112. The server ESS application 108, (e.g., via the clustering module 112) is configured to cluster (i.e., bin, group, link, or otherwise associate) the airway models according to similar centerline path length and one or more diameter characteristics (e.g., average diameter of the airway along the centerline). The clusters utilized by clustering module 112 comprise at least a first and second cluster, however, in some examples, additional clusters can be utilized by the clustering module 112. In some embodiments, the clustering module 112 is configured to cluster the airway models according to one or more patient characteristics, such as, for example, sex, race, age, height, weight, etc. Patient characteristics may be obtained from the patient information data store 120 (e.g., from one or more electronic health records associated with the patient) and/or the demographic information data store 122 (e.g., general information about different demographic groupings). In some examples, the number of clusters that are used by the server ESS application 108 may correspond to the number of stent offerings once translated into a product. In some embodiments, the number of clusters used by clustering module 112 may be varied according to, for example, stent fit or deviation in curvature and/or diameter from population curves, percentage of the population to be captured and/or number of clusters or stent designs to be used. In some examples, the clustering module 112 may use a combination of criteria (e.g., spline curve fit and demographic information) in order to group the airway models into clusters.

After the clusters have been developed, the server ESS application 108 is configured to calculate one or more stent fit parameters for each cluster. In an example, the server ESS application 108 calculates a spline curve fit for the centerlines within each cluster. In some embodiments, the fit line is a spline curve, but other fit methodologies are contemplated, such as, for example, point clouds. The server ESS application 108 is further configured to compute an average (or another mathematical combination) of the spline curves within each cluster, creating a generalized spline fit curve for each cluster. In an example, a plurality of control points associated with each extracted centerline are utilized to fit the spline curve to a centerline. For example, each centerline has at least two control points, one at the beginning of the area of interest and one at the end of the area of interest. However, a centerline may have additional control points (e.g., between a beginning and end point) that are utilized by the server ESS application 108 to fit the spline curve more accurately between each of the control points by following the curvature of the airway. In an example, the number of control points is predetermined. In another example, the number of control points may be adjusted based upon the complexity of the modeled airway.

The server ESS application 108 is further configured to average the spline control points for each cluster to create one generalized spline curve for each cluster. In some embodiments, the number of control points is normalized for each cluster. The normalized number of control points may be used to create distributions for clustering. Moreover, cartesian coordinates XYZ will have a distribution as well as diameters along the curve. Once a cluster-wide generalized spline curve is calculated, the server ESS application 108 is further configured to calculate an average (or other mathematical combination) of the diameters along the centerlines for the cluster-wide generalized spline curve. Using the cluster-wide spline curve and the average diameters (or another mathematical combination of diameters) along the curve, the server ESS application 108 generates an optimized stent shape using optimization module 114. The optimized stent shape is therefore representative of the population of airway models (and the corresponding patient population) within each cluster.

In certain embodiments, the stent implant design optimization process as described above is accomplished by fixing two of the variables (assumptions) to optimize another. In a first example, the allowable deviation and/or fit of the stents for the population and required percentage of the population to be captured are fixed, which results in the server ESS application 108 generating the required minimum number of clusters (stents). In a second example, the required percentage of the population to be captured and number of clusters (stents) are fixed, which results in the server ESS application 108 generating a number of stents with minimized deviation or best fit stents. In a third example, the required stent fit and number of clusters (or stent designs allowed) is fixed, which results in the server ESS application 108 generating the percentage of the population that can be captured.

In an exemplary operation of system 100, a clinician operating client computing device 124 may want to determine if an optimized stock stent associated with the ESS application is appropriate for a given patient, or if a custom stent is needed/warranted under the circumstances, such as, for example, an extreme airway anatomy and/or pathology. In an example, the client ESS application 132 receives user input (e.g., via user interface 134) indicative of an intent to identify an appropriate stent for a patient with a pathological airway. The client ESS application 132 then receives user input comprising patient information. The patient information is transmitted to the server ESS application 108, which may obtain imaging data related to a patient associated with the patient information (e.g., from the imaging data store 118). In certain embodiments, imaging data associated with the patient is transmitted directly from the client ESS application 124 to the server ESS application 108. Based upon the imaging data received, the server ESS application 108 performs the same or similar process on the received imaging data as is performed when establishing the one or more clusters. Specifically, the server ESS application 108 at least extracts a centerline from the imaging data (which may be generated at the client ESS application 124 or the server ESS application 108), calculates a path length for the centerline, and calculates one or more diameter characteristics (e.g., an average diameter) of the airway along the centerline. From these calculations, the server ESS application 108 identifies an appropriate cluster correlated with the calculations. The server ESS application 108 may then generate a recommendation identifying the stent associated with the identified cluster and cause the recommendation to be displayed that the client computing device 124.

Figure 3:
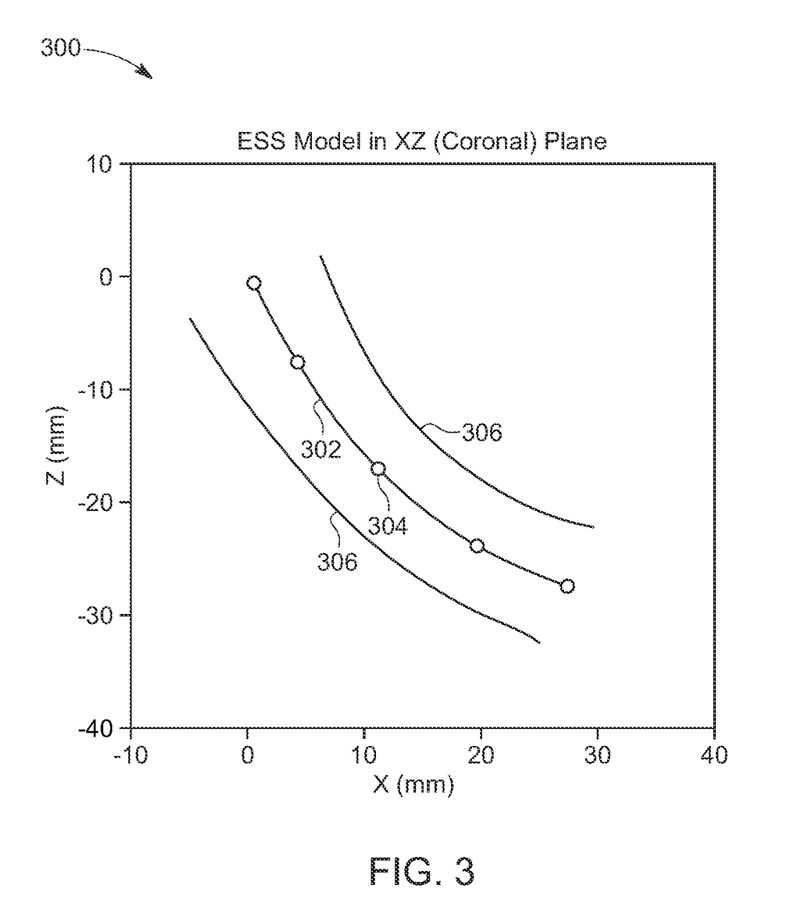
FIG. 3 illustrates a cross-sectional view of an exemplary stent generated according to the technology described herein.
Figure 4:
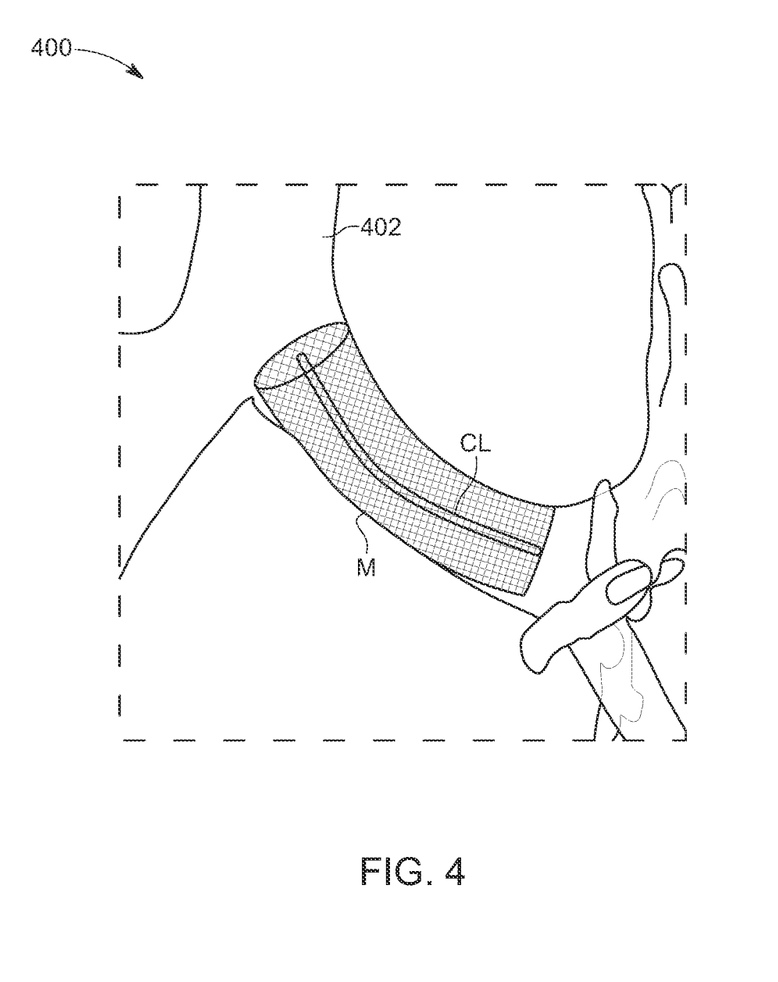
FIG. 4 illustrates placement of an exemplary stent within an airway model.

FIG. 3 shows a cross-section 300 of an ESS stent design (single cluster) in the coronal plane for a left main stem as a final result of population modeling for anatomical structure specifications according to the methodologies described herein. In an example, the control points 304 (along the center line) are the averaged control points of the fitted spline curves, the line 302 (center line) is a generalized spline curve from the averaged spline control points, and the outside lines 306 (outside lines) represent the actual walls of the stent or average diameters along the generalized spline curve. This is constructed by combining the generalized spline curve and the average diameters along the curve to create the final stent shape. FIG. 4 shows an exemplary final 3D ESS model 400 derived from these elements placed in an airway 402 virtually (e.g., as a visualization caused to be displayed at user interface 134), wherein M is a surface on along the airway 402 and CL is the centerline.

Figure 5:
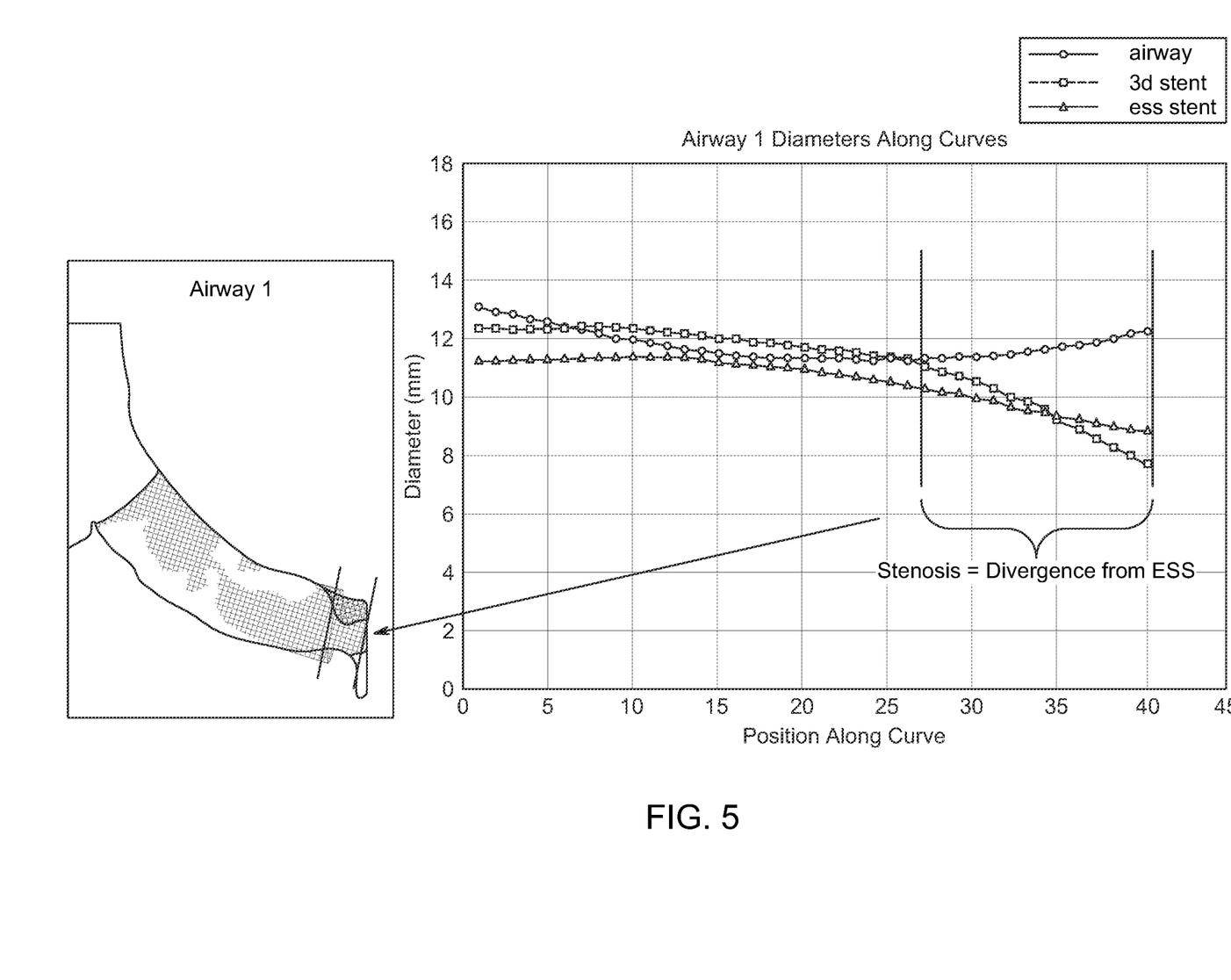
FIG. 5 illustrates an exemplary graphical user interface indicating a measured stenosis.

FIG. 5 illustrates an exemplary user interface display displaying identified patients who are anatomical outliers that may not be suitable for the population-based implants (e.g., as determined by server ESS application 108). In some embodiments, upon such a determination, the server ESS application 108 may generate a recommendation of an alternative therapy (e.g., such as patient-specific implants) and cause the recommendation to be displayed at the user interface 134. It also enables disease detection within tubular structures and disease severity quantification with comparison back to the original native population model. Moreover, because the generated stent shapes for each cluster are representative of an optimized nonpathological airway (or other tubular structure) deviation therefrom can be used as a quantitative measurement of the severity of a diseased airway. In an exemplary LMS airway embodiment, a reduced diameter from the known native or nonpathological ESS model may represent a stenosis of some calculated degree that can then be classified into a diagnostic system for severity to enable more objective clinical decision-making (e.g., FIG. 5, which illustrates an exemplary user interface display of a calculated stenosis for an exemplary airway).

Figure 6:
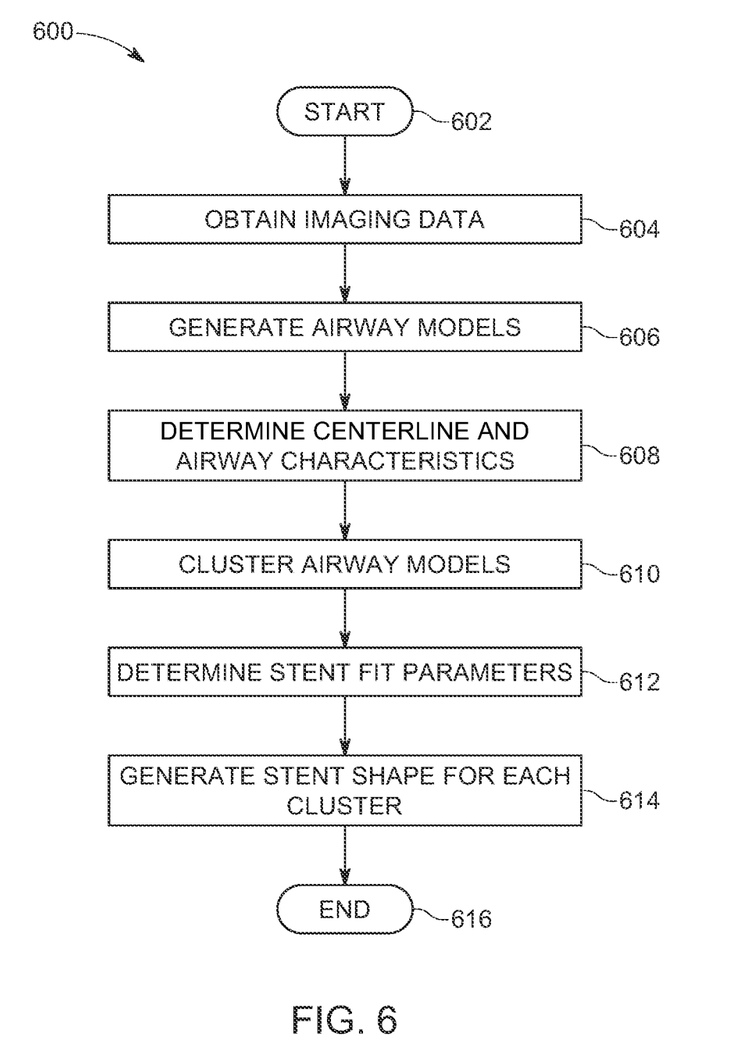
FIG. 6 illustrates an exemplary flow diagram depicting an exemplary methodology for generating an enhanced stock stent.

FIG. 6 illustrates an exemplary methodology relating to generating one or more optimized stent designs for treatment or repair of tubular anatomical structures (e.g., stenotic or narrowed tubular structures). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 6 a methodology 600 for generating one or more optimized stent designs for treatment or repair of tubular anatomical structures is illustrated. The methodology 600 starts at 602, and comprises, obtaining imaging data at 604. As described herein, imaging data comprises images associated with one or more anatomical structures (e.g., chest CT scans indicative of one or more human airways) for a patient population. At 606, airway models are generated based upon the imaging data. At 608, a centerline is determined for each airway model (or portion thereof) and for each determined centerline, certain airway characteristics are determined based on the centerline. The airway characteristics may comprise, for example, an average diameter of the airway as measured at predetermined intervals along the centerline.

At 610, the airway models are clustered. The clusters comprise at least a first cluster and a second cluster. In an example, the airway models are clustered according to similar centerline lengths and diameters. In other examples, the airway models are clustered according to demographic similarities or a combination of demographic similarities and centerline characteristics. At 612, stent fit parameters are determined. The stent fit parameters are determined based upon the airway models within each cluster. For example, a spline curve may be used to fit each curve with control points along each centerline of the airway models within each cluster. As a further example, the spline curve control points for each cluster may be averaged to create one generalized spline curve representative of the plurality of airways in a cluster. As yet a further example, an average diameter may again be taken along the centerlines for each cluster. At 614, an optimized stent shape is generated for each cluster. For example, the optimized stent shape is generated based upon the generalized spline curve and the average diameters. The methodology terminates at 616.

Figure 7:
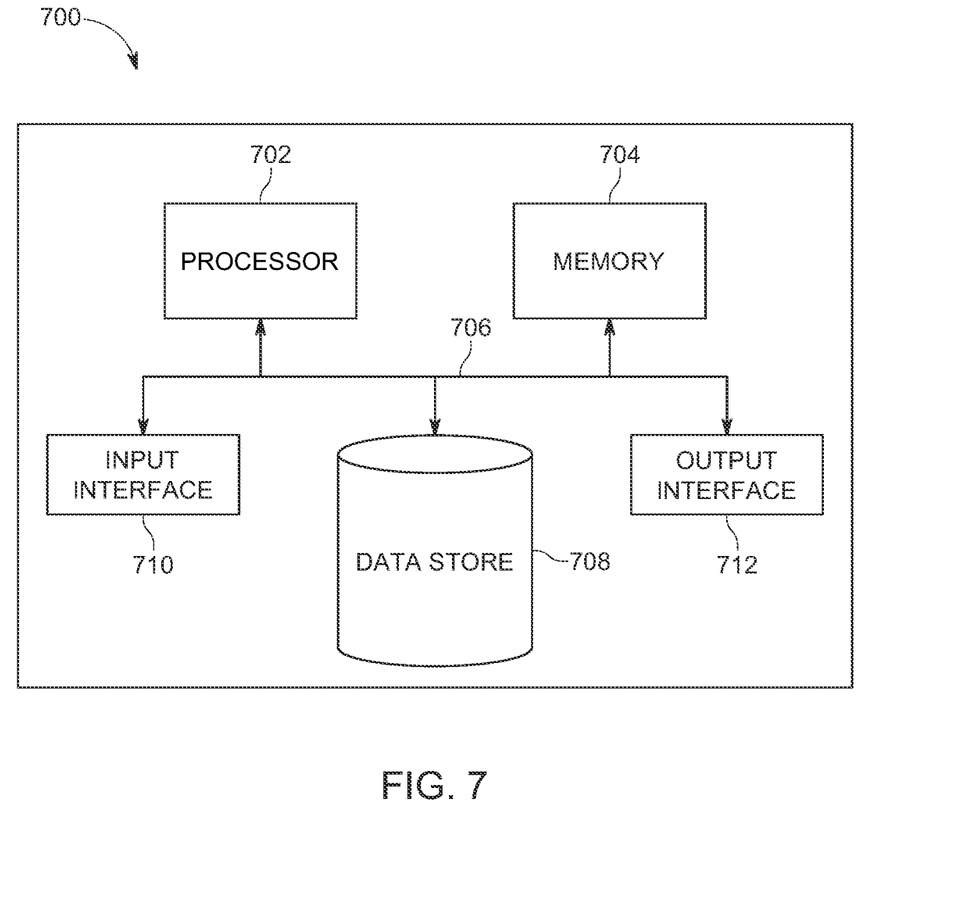
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be used in a system for enhanced stock stent (ESS) modeling as described herein. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706.

The computing device 700 additionally includes a data store 708 that is accessible by the processor 702 by way of the system bus 706. The data store 708 may include executable instructions.

The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

As used herein, the term "patient" can refer, interchangeably, to any warm-blooded organism including, but not limited to, a human being, a pig, a rat, a mouse, a dog, a cat, a goat, a sheep, a horse, a monkey, an ape, a rabbit, a cow, etc.

Described herein are various features pertaining to generating optimized stent designs for treatment of tubular anatomical structures. The various features are understood with at least the following examples.

(A1) In an aspect, a method (e.g., performed by a processor of a computing system) described herein comprises obtaining imaging data, wherein the imaging data comprises a plurality of images captured from a patient population. The method additionally comprises generating a plurality of airway models, wherein the airway models are based upon the imaging data. The method further comprises, for at least a subset of the plurality of airway models, determining a centerline for one or more airways depicted within each airway model within the subset of the plurality of airway models. The method additionally comprises determining one or more airway characteristics for the subset of the plurality of airway models, wherein the one or more airway characteristics are based upon the centerline of an airway. The method further comprises clustering the subset of the plurality of airway models into at least a first cluster and a second cluster. The method additionally comprises determining one or more stent fit parameters for airway models in the first cluster and airway models in the second cluster. The method further comprises generating a first stent shape corresponding to the first cluster and a second stent shape corresponding to the second cluster.

(A2) In some embodiments of the exemplary method of (A1), the one or more airway characteristics comprise at least one of a centerline path length or one or more diameter characteristics.

(A3) In some embodiments of the exemplary method of at least one of (A1)-(A2), the one or more airway characteristics comprises a centerline path length and one or more diameter characteristics of the airway along the centerline, wherein at least one of the one or more diameter characteristics of the airway is determined by determining, for an array of radii, the length of rays casted radially outward from the centerline across predetermined discrete intervals.

(A4) In some embodiments of the exemplary method of at least one of (A1)-(A3), the clustering is based upon at least one of the centerline path length, one or more diameter characteristics, or demographic information for the patient population.

(A5) In some embodiments of the exemplary method of at least one of (A1)-(A4), the imaging data comprises computed tomography (CT) scan data.

(A6) In some embodiments of the exemplary method of at least one of (A1)-(A5), the method additionally comprises receiving an airway model corresponding to a first patient. The method further comprises determining a centerline for at least one airway of the airway model corresponding to the first patient. The method additionally comprises determining one or more airway characteristics for the at least one airway of the airway model corresponding to the first patient. The method further comprises determining that the airway model corresponding to the first patient fits within the first cluster and associating the first stent shape with the airway model corresponding to the first patient.

(A7) In some embodiments of the exemplary method of at least one of (A1)-(A6), the method additionally comprises determining that an airway model corresponding to a second patient does not fit within a cluster. The method further comprises detecting an area of pathology in at least one airway of the airway model corresponding to the second patient based upon a deviation from the first stent shape corresponding to the first cluster and generating a recommendation for an alternative therapy for the second patient.

(A8) In some embodiments of the exemplary method of at least one of (A1)-(A7), the one or more stent fit parameters comprise at least one of a spline curve fit, a combination of spline control points, or one or more diameter characteristics based upon the centerlines and wherein the first stent shape is based upon a generalized spline curve and one or more diameter characteristics along the spline curve.

(A9) In some embodiments of the exemplary method of at least one of (A1)-(A8), the method further comprises clustering the subset of the plurality of airway models into a number of clusters corresponding to an existing subset of stent designs.

(A10) In some embodiments of the exemplary method of at least one of (A1)-(A9), the method additionally comprises selecting imaging data indicative of a non-pathological patient population.

(B1) In another aspect, a method (e.g., performed by a processor of a computing system) described herein comprises obtaining imaging data, wherein the imaging data comprises a plurality of images captured from a patient population. The method additionally comprises generating a plurality of anatomical tubular structure models, wherein the anatomical tubular structure models are based upon the imaging data. The method further comprises, for at least a subset of the plurality of anatomical tubular structure models, determining a centerline for at least a portion of a tubular structure depicted within the subset of the plurality of anatomical tubular structure models. The method additionally comprises determining one or more tubular structure characteristics for the subset of the plurality of anatomical tubular structure models, wherein the one or more tubular structure characteristics are based upon the centerline. The method additionally comprises clustering the subset of the plurality of anatomical tubular structure models into at least a first cluster and a second cluster. The method further comprises determining one or more stent fit parameters for anatomical tubular structure models in the first cluster and one or more stent fit parameters for anatomical tubular structure models in the second cluster. The method additionally comprises generating a first stent shape corresponding to the first cluster and a second stent shape corresponding to the second cluster.

(B2) In some embodiments of the exemplary method of (B1), the method additionally comprises receiving an anatomical tubular structure model corresponding to a first patient. The method further comprises determining a centerline for at least one tubular structure of the anatomical tubular structure model corresponding to the first patient. The method additionally comprises determining one or more tubular structure characteristics for the at least one tubular structure of the anatomical tubular structure model corresponding to the first patient.

(B3) In some embodiments of the exemplary method of at least one of (B1)-(B2), the method further comprises determining that the anatomical tubular structure model corresponding to the first patient fits within the first cluster and associating the first stent shape with the anatomical tubular structure model corresponding to the first patient.

(B4) In some embodiments of the exemplary method of at least one of (B1)-(B3), the method additionally comprises determining that an anatomical tubular structure model corresponding to a second patient does not fit within a cluster. The method further comprises detecting an area of pathology in at least a portion of the anatomical tubular structure model corresponding to the second patient based upon a deviation from the first stent shape corresponding to the first cluster and generating a recommendation for an alternative therapy for the second patient.

(B5) In some embodiments of the exemplary method of at least one of (B1)-(B4), the one or more tubular structure characteristics comprises a centerline path length and one or more diameter characteristics, wherein at least one of the one or more diameter characteristics is determined by determining, for an array of radii, the length of rays casted radially outward from the centerline across predetermined discrete intervals.

(C1) In yet another aspect, a computing system comprises a processor and a memory, wherein the memory stores instructions (e.g., an ESS application) that, when executed by the processor, cause the processor to perform at least one of the methods disclosed herein (e.g., any of the methods of (A1)-(A10) or (B1)-(B5)).

(D1) In yet another aspect, a computer readable storage medium comprises instructions (e.g., an ESS application) that, when executed by a processor, cause the processor to perform at least one of the methods disclosed herein (e.g., any of the methods of (A1)-(A10) or (B1)-(B5)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by the processor, cause the processor to perform acts comprising:
obtaining imaging data, wherein the imaging data comprises a plurality of images captured from a patient population;

generating a plurality of airway models, wherein the airway models are based upon the imaging data;
for at least a subset of the plurality of airway models, determining a centerline for one or more airways depicted within each airway model within the subset of the plurality of airway models;
determining one or more airway characteristics for the subset of the plurality of airway models, wherein the one or more airway characteristics are based upon the centerline of an airway;
clustering the subset of the plurality of airway models into at least a first cluster and a second cluster;
determining one or more stent fit parameters for airway models in the first cluster and airway models in the second cluster;
generating a first stent shape corresponding to the first cluster and a second stent shape corresponding to the second cluster.

2. The computing system of claim 1, wherein the imaging data comprises computed tomography (CT) scan data.

3. The computing system of claim 1, wherein the one or more airway characteristics comprise at least one of a centerline path length or one or more diameter characteristics.

4. The computing system of claim 1, wherein the one or more airway characteristics comprises a centerline path length and one or more diameter characteristics of the airway along the centerline, wherein at least one of the one or more diameter characteristics of the airway is determined by determining, for an array of radii, a length of rays casted radially outward from the centerline across predetermined discrete intervals.

5. The computing system of claim 4, wherein the clustering is based upon the centerline path length and an average diameter.

6. The computing system of claim 1, wherein the clustering is based upon demographic information for the patient population.

7. The computing system of claim 1, further comprising:
receiving an airway model corresponding to a first patient;
determining a centerline for at least one airway of the airway model corresponding to the first patient; and
determining one or more airway characteristics for the at least one airway of the airway model corresponding to the first patient.

8. The computing system of claim 7, further comprising:
determining that the airway model corresponding to the first patient fits within the first cluster; and
associating the first stent shape with the airway model corresponding to the first patient.

9. The computing system of claim 7, further comprising:
determining that the airway model corresponding to the first patient does not fit within a cluster;
detecting an area of pathology in the at least one airway based upon a deviation from the first stent shape corresponding to the first cluster; and
generating a recommendation for an alternative therapy for the first patient.

10. The computing system of claim 1, wherein the one or more stent fit parameters comprise at least one of a spline curve fit, a combination of spline control points, or one or more diameter characteristics based upon the centerlines.

11. The computing system of claim 1, wherein the first stent shape is based upon a generalized spline curve and one or more diameter characteristics along the spline curve.

12. The computing system of claim 1, further comprising: clustering the subset of the plurality of airway models into a number of clusters corresponding to an existing subset of stent designs.

13. The computing system of claim 1, wherein the obtaining imaging data further comprises selecting imaging data indicative of a nonpathological patient population.

14. The computing system of claim 1, wherein the airway model is a 3-dimensional model.

15. A method, the method comprising:
obtaining imaging data, wherein the imaging data comprises a plurality of images captured from a patient population;
generating a plurality of anatomical tubular structure models, wherein the anatomical tubular structure models are based upon the imaging data;
for at least a subset of the plurality of anatomical tubular structure models, determining a centerline for at least a portion of a tubular structure depicted within the subset of the plurality of anatomical tubular structure models;
determining one or more tubular structure characteristics for the subset of the plurality of anatomical tubular structure models, wherein the one or more tubular structure characteristics are based upon the centerline;
clustering the subset of the plurality of anatomical tubular structure models into at least a first cluster and a second cluster;
determining one or more stent fit parameters for anatomical tubular structure models in the first cluster and one or more stent fit parameters for anatomical tubular structure models in the second cluster; and
generating a first stent shape corresponding to the first cluster and a second stent shape corresponding to the second cluster.

16. The method of claim 15, further comprising:
receiving an anatomical tubular structure model corresponding to a first patient;
determining a centerline for at least one tubular structure of the anatomical tubular structure model corresponding to the first patient; and
determining one or more tubular structure characteristics for the at least one tubular structure of the anatomical tubular structure model corresponding to the first patient.

17. The method of claim 15, further comprising:
determining that the anatomical tubular structure model corresponding to the first patient fits within the first cluster; and
associating the first stent shape with the anatomical tubular structure model corresponding to the first patient.

18. The method of claim 15, wherein the one or more tubular structure characteristics comprises a centerline path length and one or more diameter characteristics, wherein at least one of the one or more diameter characteristics is determined by determining, for an array of radii, a length of rays casted radially outward from the centerline across predetermined discrete intervals.

19. A non-transitory computer-readable storage medium comprising instructions that, when executed by a processor, cause the processor to perform acts comprising:
obtaining imaging data, wherein the imaging data comprises a plurality of images captured from a patient population;
generating a plurality of airway models, wherein the airway models are based upon the imaging data;
for at least a subset of the plurality of airway models, determining a centerline for at least one airway depicted within each airway model within the subset of the plurality of airway models;

determining one or more airway characteristics for the subset of the plurality of airway models based upon the determined centerlines;

clustering the subset of the plurality of airway models based upon the one or more airway characteristics, wherein a first portion of the subset of the plurality of airway models is clustered into a first cluster and a second portion of the subset of the plurality of airway models is clustered into a second cluster;

determining one or more stent fit parameters for the plurality of airway models in the first cluster and the second cluster; and generating a first stent shape corresponding to the first cluster and a second stent shape corresponding to the second cluster.

20. The non-transitory computer-readable storage medium of claim 19, wherein the one or more airway characteristics comprise a centerline path length and an average diameter along the centerline, wherein the average diameter along the centerline is determined by determining, for an array of radii, a length of rays casted radially outward from the centerline across predetermined discrete intervals.

* * * * *